United States Patent [19]
Fink

[11] Patent Number: 5,921,809
[45] Date of Patent: Jul. 13, 1999

[54] SAFETY BATTERY AND JUMPER CABLES THEREFOR

[75] Inventor: David Marshall Fink, Madison, Wis.

[73] Assignee: Battery Boy LLC, Madison, Wis.

[21] Appl. No.: 08/865,312

[22] Filed: May 29, 1997

[51] Int. Cl.[6] .................................................. H01R 11/00
[52] U.S. Cl. ........................... 439/504; 439/679; 439/884
[58] Field of Search ..................... 439/491, 504, 439/883, 884, 952; 429/163, 178, 179, 187

[56] References Cited

U.S. PATENT DOCUMENTS

| | | |
|---|---|---|
| 3,936,121 | 2/1976 | Leinberger . |
| 4,274,690 | 6/1981 | Hargett et al. . |
| 4,286,172 | 8/1981 | Millonzi et al. . |
| 4,721,479 | 1/1988 | Shuman . |
| 4,913,981 | 4/1990 | Hynes et al. ............................. 439/491 |
| 4,923,415 | 5/1990 | Lee . |
| 4,975,089 | 12/1990 | Lee . |
| 5,111,130 | 5/1992 | Bates . |
| 5,367,243 | 11/1994 | Wells et al. . |
| 5,435,759 | 7/1995 | Adams et al. . |

*Primary Examiner*—Steven L. Stephan
*Assistant Examiner*—Brian J. Biggi
*Attorney, Agent, or Firm*—DeWitt Ross & Stevens SC

[57] ABSTRACT

An improved battery and jumper cables therefor are shown and described. The battery includes positive and negative terminals respectively defining male members or female sockets having "+" and "−" shapes, and the jumper cables similarly include cable terminals defining complementary female sockets or male members sized to engage the battery terminals.

20 Claims, 7 Drawing Sheets

SAFETY BATTERY AND JUMPER CABLES THEREFOR

FIELD OF THE INVENTION

This disclosure concerns an invention relating generally to batteries and jumper cables, and more specifically to automotive batteries and jumper cables which are resistant to short-circuiting.

BACKGROUND OF THE INVENTION

Jump-starting a vehicle with a dead battery is a relatively risky activity, primarily for two reasons. Initially, as the owner's manuals of most current automobiles state, serious damage to automotive electrical systems can occur in the event of a short circuit, or in the case of a radical disparity between the voltage of the jumping battery and the nominal voltage of the receiving electrical system. Because most current automobiles rely on electronic memories for their operation, an error committed while jumping the battery can erase the memory and render the entire vehicle inoperative, regardless of whether its battery is recharged or not. Beyond that, there is a strong element of personal risk because batteries may explode during charging, causing chemical burns and blindness. While currently available automotive batteries are far more resistant to exploding than those of a decade ago owing to new battery formulations, incorporation of vent caps, etc., the risk still remains. This is particularly true in view of the fact that most people who jump-start vehicles do not know proper jumping procedures or do not take heed of the importance of proper procedures. Following are the "official" procedures to be followed while jump-starting a vehicle, as reflected by numerous vehicle owner's manuals and automotive clubs:

(1) Make sure the battery contents are not frozen. If they are frozen, do not attempt to jump the battery.

(2) Bring the vehicle with the active battery near the vehicle with the dead battery and park it so that the vehicles are not touching.

(3) Turn off all unnecessary accessories and lights on both vehicles, open their hoods, and be sure that their batteries have plenty of ventilation.

(4) Start the vehicle with the active battery and let it run for at least two or three minutes at a fast idle to ensure the battery has a charge.

(5) Put on protective eyewear.

(6) Connect the positive booster cable clamp (generally red) to the positive terminal on the dead battery.

(7) Connect the other positive booster cable clamp to the positive terminal on the active battery.

(8) Connect the negative booster cable clamp (usually black) to the negative terminal of the good battery.

(9) Connect the other negative booster cable clamp to a clean, unpainted area on the engine block or frame of the car with the dead battery. (Note that it is not necessary to connect the negative booster cable clamp to the negative terminal of the dead battery because the negative terminal is "grounded" to the engine block/vehicle frame.)

(10) Now that the active and dead batteries are in electrical communication, the vehicle with the active battery should continue to run at high idle for five or more minutes to allow the dead battery to build a charge and to warm its electrolyte.

(11) The vehicle with the formerly dead battery should be started and allowed to run at a high idle for a few minutes before disconnecting the booster cables.

(12) The booster cables should be disconnected in an order reversed from that of steps (6)–(9).

The steps set out above are intended to minimize the possibility of short-circuiting and sparking in the vicinity of the batteries. Sparking can ignite hydrogen gas produced by the batteries, blowing the batteries apart and spraying acid and battery fragments. However, even if the aforementioned directions for jump-starting are followed precisely, there is still the potential for a spark. This is why current vehicle owner's manuals and automotive clubs first recommend that a professional service be called in the event of a dead battery, and that jump-starting by vehicle owners should only be performed when professional help is not available.

The primary cause of sparking (and explosion) is the accidental reversed connection of positive and negative jumper cables to a battery. It is generally easy to correctly connect booster cable clamps to the proper terminals of a new battery during the daytime since the positive terminals are marked with a plus sign and are generally colored red. However, as the batteries age they generally become covered with dirt and road grime, making the polarity of the terminals difficult to discern. Additionally, it can be difficult to make out the polarity of the terminals when little or no light is available.

The possibility of a spark is also enhanced by the fact that the positive and negative terminals of automotive batteries are already occupied by the clamps connecting the terminals to the vehicle's electronic system, thereby making space on the terminals scarce for the connection of jumper cable clamps. Because clamping area is small and scarce, there is an enhanced likelihood that a jumper cable clamp might come loose and slide or fall to contact areas having the opposite polarity. This likelihood could be decreased if the clamps of the vehicle's electrical system were removed prior to jumping, but the fact is that this is rarely done owing to lack of tools on hand and the time and inconvenience this would entail.

SUMMARY OF THE INVENTION

The present invention is directed to batteries and jumper cables as defined by the claims set out at the end of this disclosure. To briefly summarize these batteries and jumper cables, batteries are provided with a positive battery terminal formed in the shape of a "+" sign and a negative battery terminal formed in the shape of a "−" sign. Jumper cables are then provided with a positive conductor having ends adapted to engage only the "+" battery terminal in electrical communication, and a negative conductor having terminals adapted to engage only the "−" battery terminal in electrical communication. For example, the battery terminals may be female sockets having interior walls contoured to define "+" and "−" cross-sectional areas, and the jumper cables may include a positive conductor having "+"-shaped male cable terminal ends and a negative conductor having "−"-shaped male cable terminal ends. The "+"-shaped battery and cable terminals may engage each other in complementary fashion, as may the "−"-shaped battery and cable terminals. The "−"-shaped negative male cable terminals are dimensioned so that they cannot enter the "+"-shaped positive female terminal(s) on the battery. Any female terminals are surrounded by insulating material such as rubber so that they cannot be engaged in electrical communication unless they are entered and their interior walls are contacted.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
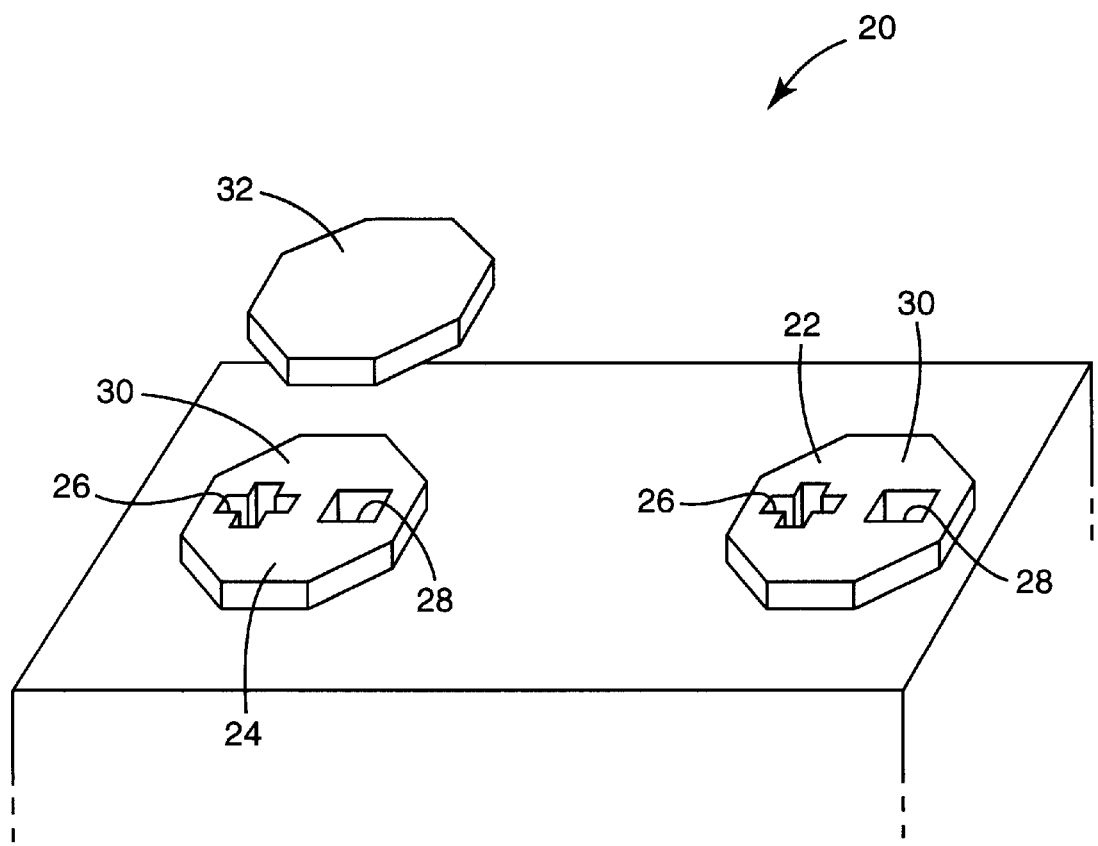
FIG. 1 is a partial perspective view of a first embodiment of a battery in accordance with the present invention.

FIG. 1 illustrates a preferred embodiment of a battery in accordance with the present invention, designated generally by the reference numeral 20. The battery 20 is preferably provided with two sets 22 and 24 of terminals, each set including a positive battery terminal 26 and a negative battery terminal 28. The first terminal set 22 is connected to the car's electrical system, and the second terminal set 24 is connected in parallel with the first terminal set 22 and is provided solely for purposes of jumping/recharging. Within each terminal set 22 and 24, the battery terminals 26 and 28 are defined by female sockets, the positive battery terminals 26 having a "+"-shaped entry and passage and the negative battery terminals 28 having a "−"-shaped entry and passage. As FIG. 1 illustrates, each terminal set 22 and 24 may be provided on a raised insulated land 30 which surrounds the entries of the battery terminals 26 and 28, thereby preventing the interior walls of the battery terminals from electrically communicating with a conductor unless that conductor affirmatively enters the battery terminals and contacts their interior walls. These lands 30 may be engaged by removable caps 32 to protect the terminal sets 22 and 24 when not in use. The illustrated shape of the lands 30 and caps 32, as well as the inclusion of the lands 30 themselves, are not regarded to be critical to the invention; rather, the lands 30 are regarded as being helpful because they surround and to a large extent insulate the terminals 26 and 28 from their exterior, and additionally the caps 32 are regarded as being helpful because they allow the ability to cover and protect terminal sets that are not being used. However, the lands 30 and caps 32 may be entirely excluded if desired.

Figure 2:
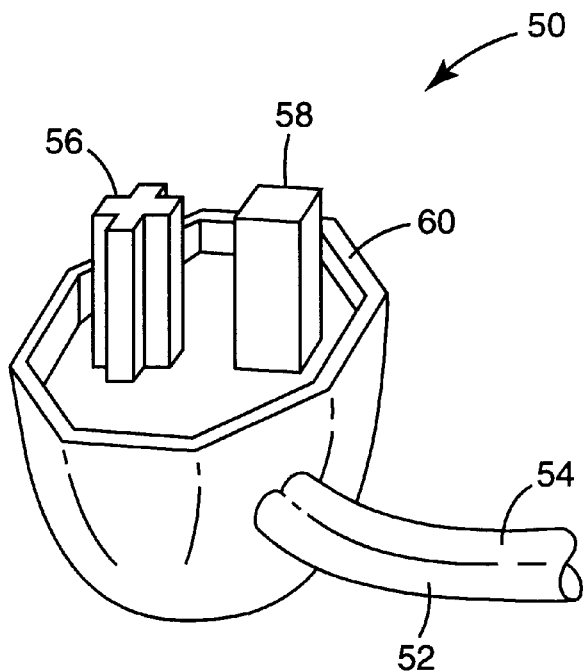
FIG. 2 is a partial perspective view of a first embodiment of a jumper cable in accordance with the present invention.

FIG. 2 then illustrates the terminal of a jumper cable adapted for use with the battery terminal sets 22 and 24, designated generally at the reference numeral 50. The cable 50 includes insulated positive and negative conductors 52 and 54, with the positive conductor 52 ending in a male cable terminal 56 having a "+"-shaped cross-sectional area and the negative conductor 54 ending in a male cable terminal 58 having a "−"-shaped cross-sectional area. Considering FIGS. 1 and 2 in conjunction, the cable terminals 56 and 58 may be engaged with either of battery terminal sets 22 or 24 on the battery 20 with the male cable terminals 56/58 extending within the female battery terminals 26/28 to engage their interior walls in electrical communication. Preferably, the "−"-shaped male cable terminal 58 is sized so that it cannot fit within the "+"-shaped female battery terminal 26, and as a result, a circuit can only be closed between the active and dead batteries when the positive and negative conductors of the cable 50 are connected to the proper battery terminals. It is noted that the first terminal set 22 of the battery 20 is connected to the vehicle's electrical system by use of a cable similar to jumper cable 50.

An optional (but recommended) feature of the cable 50, as well as all other cables described in this disclosure, is that they bear securement means for better securing the cable terminals 56 and 58 to the battery terminals 26 and 28 when the cable and battery terminals are engaged. As illustrated in FIG. 2, this may be done by surrounding the cable terminals 56/58 with a ridge 60 which surrounds the land 30 in complementary fashion when the cable terminals 56/58 and battery terminals 26/28 are engaged. This covers the connection between the cable terminals 56/58 and battery terminals 26/28 in watertight fashion to further protect against the possibility of inadvertent shorting.

Figure 3:
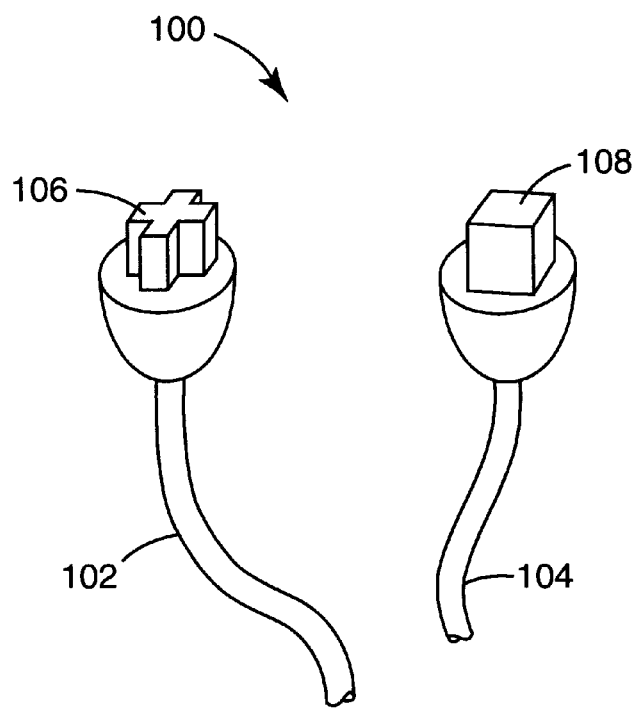
FIG. 3 is a partial perspective view of a second embodiment of a jumper cable in accordance with the present invention.

FIG. 3 then illustrates an alternate embodiment of the jumper cable 50 of FIG. 2 at the reference number 100. The jumper cable 100 has separate positive and negative conductors 102 and 104 with separate male positive and negative cable terminals 106 and 108, and may also be used in conjunction with the battery 20 of FIG. 1. Because the jumper cables 100 allow for variable spacing between the positive and negative male cable terminals 106 and 108, they are particularly useful in the event that manufacturers produce batteries 20 which do not have standard distances between the positive and negative female battery terminals 26 and 28. The conductors 102 and 104 are illustrated as leading to the terminals 106 and 108 in a generally coaxial fashion, but if potential space savings and better visibility of the terminals 106 and 108 are desired, the conductors 102 and 104 could instead approach the terminals 106 and 108 at an angle, as is the case with the jumper cable 50 of FIG. 2.

Figure 4:
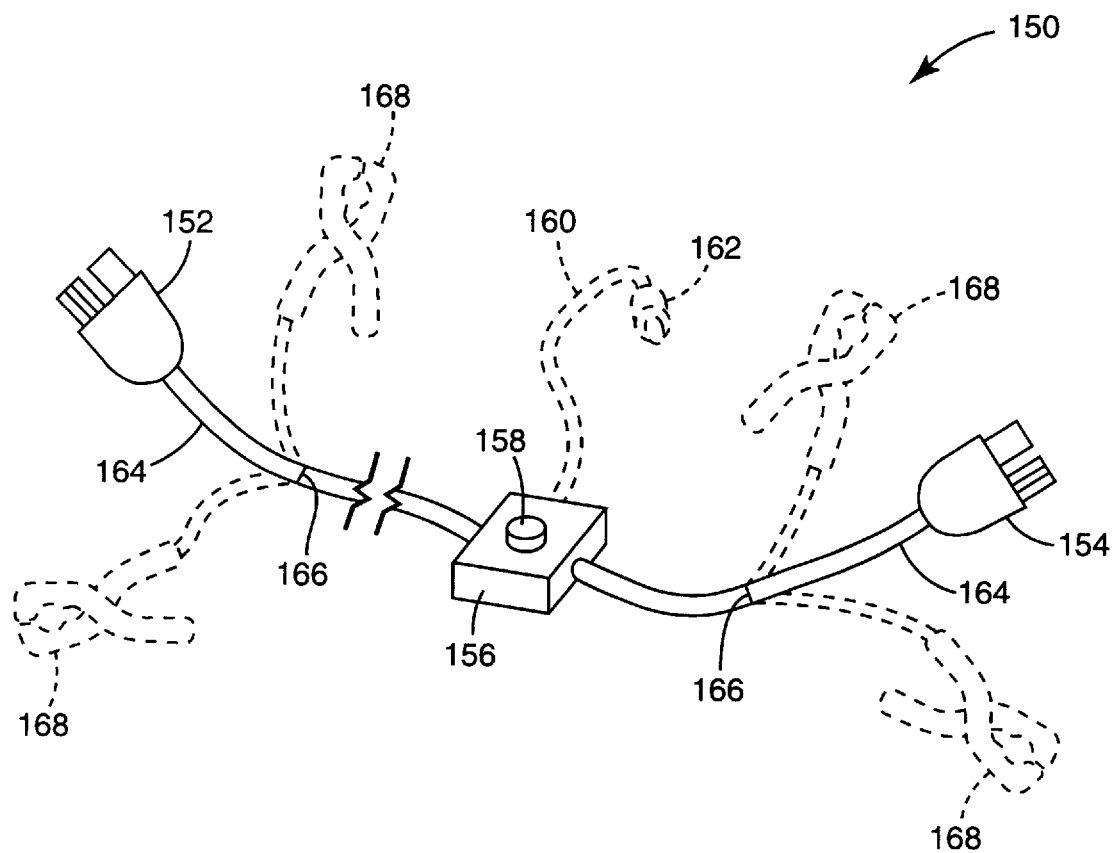
FIG. 4 is a partial perspective view illustrating a preferred embodiment of a jumper cable utilizing jumper cable terminals such as those illustrated in FIG. 2.

FIG. 4 illustrates a particularly preferred embodiment of an overall jumper cable at the reference numeral 150. The jumper cable 150 utilizes cable terminals 152 and 154 such as those of the jumper cable 50 of FIG. 2, or the jumper cable 100 of FIG. 3, but is particularly illustrated using cable terminals similar to cable terminals 56 and 58 of jumper cable 50. The intermediate portion of the jumper cable 150 includes a control box 156 which provides any one or more of several features.

(1) The control box 156 may include a surge protection means for preventing current from flowing through the jumper cable 150 when the voltage difference between the opposing cable terminals 152/154 exceeds a predetermined value. As an example, the surge protection means may be provided by a fuse (not shown) which is rated appropriately for the electrical system of the vehicle for which it is to be used. This prevents overloading of the vehicle electrical system (and potential burning of electronic memory) in the event that the charging source has a voltage exceeding the nominal rating of the electrical system. Additionally or alternatively, solid-state power controls may be used.

(2) The control box 156 may include a normally open switch 158 maintaining either or both of the positive and negative conductors of the jumper cable 150 in an open-circuit condition. The normally open switch 158 must be manually held in closed position to close the circuit between the terminals 152 and 154 of the opposing ends of the jumper cable 150. By placing the control box 156 in an intermediate portion of the jumper cable 150, this will require the jumping personnel to stand away from both the active and dead batteries during jumping.

(3) The aforementioned switch 158 may incorporate timing means for maintaining the switch 158 in a closed state for a predetermined time interval after the switch 158 is actuated. As an example, a spring-winded or other mechanism may be incorporated into the switch 158 whereby once the switch 158 is actuated, it remains in an open state for a given period of time (e.g., 10 seconds), closes the circuit for a set period of time (e.g., 2 minutes), and then returns the circuit to an open state. This in intended to provide the personnel jumping the battery with sufficient time to actuate the switch 158, move to safety (e.g., into the disabled vehicle), and then provide a defined time window for heightened caution during jumping. The jumping personnel may then know when to attempt to start the disabled vehicle after the jumping process is completed, and may exit the vehicle to redepress the switch 158 if the vehicle is not successfully started. Apart from mechanical timers, analog and digital electronic timers may also be used.

(4) The control box 156 may include a cable 160 extending therefrom which terminates in a lamp 162. This lamp 162, which is energized when the jumper cable 150 is affixed to the charged battery, can then be used to provide illumination at the opposite end of the jumper cable 150 when connection is made to the dead battery. This assists the jumping personnel in illuminating the dead battery and avoiding inadvertent contact with surfaces having the wrong polarity, thereby creating sparks and possibly an explosion. The lamp 162 is particularly useful when jumping is performed in darkened conditions, such as in the winter months when jumping is most commonly needed and daylight hours are shorter. If feature (3) above is included as well, it may be desirable to have the lamp 162 automatically turn off when the circuit is closed between the active and dead batteries and then turn back on when the circuit is reopened. The lamp 162 will thereby signal to jumping personnel when the charging process is completed.

Also illustrated in FIG. 4 in phantom is another optional but useful feature. The novel cable terminals 152 and 154 are provided on short leads 164 which are releasably connected to the positive and negative conductors of the jumper cable at 166 by use of standard releasable electrical connections (e.g., male/female connects, NEMA/IEC plugs, or the like). Standard cable clamps 168, e.g., spring-loaded scissors-type clamps, may be plugged into the positive and negative conductors of the jumper cable 150 when the leads 164 with the novel terminators 152 and 154 are removed. This allows a battery such as the battery 20 of FIG. 1 to be jumped from a standard battery by using one of the novel terminators 152 or 154 at the battery 20 and using the standard cable clamps 168 at the standard battery. Additionally, this arrangement allows the jumper cable 150 to simply be used between standard batteries when both of the novel terminators 152 and 154 are removed and replaced by standard clamps 168.

Figure 5:
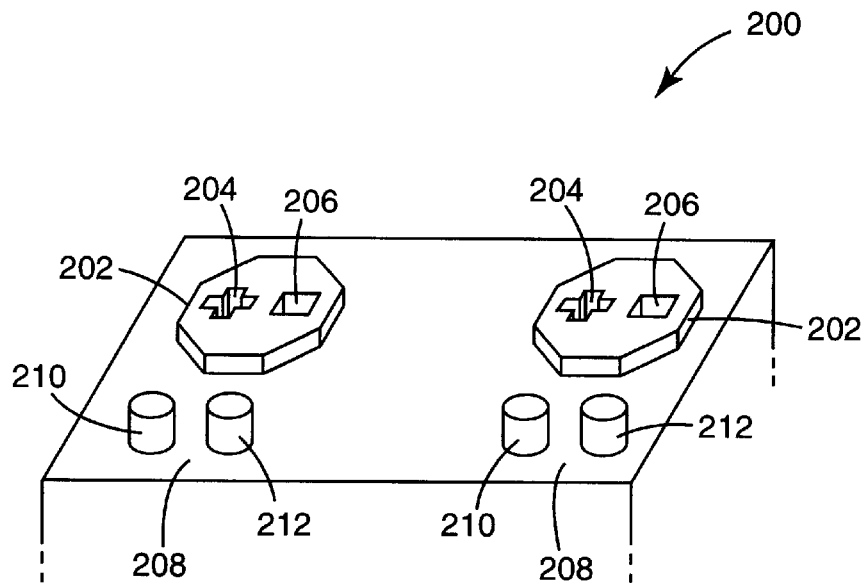
FIG. 5 is a partial perspective view of a second embodiment of a battery in accordance with the present invention.

FIG. 5 illustrates an alternate embodiment of a battery at reference numeral 200. This battery is "universal" in that it has two sets 202 of novel positive and negative battery terminals 204 and 206 as in the battery 20 of FIG. 1, and it additionally has two sets 208 of standard positive and negative battery terminal posts 210 and 212 such as those common in batteries well-known prior to this invention. The novel battery terminals 204 and 206 are connected in parallel to the standard battery terminals 210 and 212, that is, the novel positive battery terminals 204 are connected in electrical communication to the standard positive battery terminals 210 and the novel negative battery terminals 206 are respectively connected to the standard negative battery terminals 212. This battery 200 functions similarly to the battery 20 of FIG. 1 in that one terminal set 202 (or 208) is provided for connection to the automotive electrical system and one terminal set 202/208 is provided for jumping purposes. A particular advantage of the battery 200 is that jumping or connection to vehicle electrical systems may be performed by use of standard cable clamps where the novel cable terminators of FIGS. 2 or 3 are not available. It is contemplated that any battery terminals 204, 206, 210, or 212 that are not in use will be capped to protect them from inadvertent short-circuiting.

Figure 6:
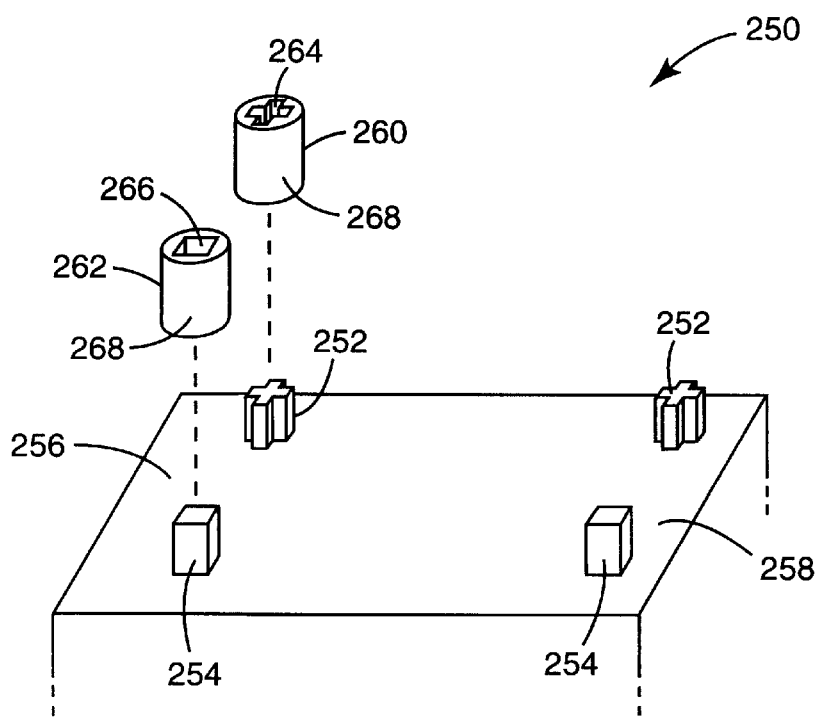
FIG. 6 is a partial perspective view of a third embodiment of a battery in accordance with the present invention.

FIG. 6 illustrates another alternate embodiment of a battery at reference numeral 250. This battery 250 is similar to the battery 20 of FIG. 1, but the positive and negative battery terminals 252 and 254 of its dual terminal sets 256 and 258 are in the form of male members, that is, they protrude from the surface of the battery 250. These battery terminals 252 and 254 may be engaged by jumper cables similar to the cables 50 and 100 of FIGS. 2 and 3, but wherein the jumper cable terminals utilize female receptacles for engaging the terminals 252 and 254. Because the battery terminals 252 and 254 protrude from the surface of the battery 250 in the fashion of standard battery terminals, they may be shorted by inadvertent contact by a common conductor, a problem encountered with standard batteries. This is why the terminals 252 and 254 are illustrated as having greater spacing therebetween as compared to the female socket terminals of the batteries 20 and 200 of FIGS. 1 and 5, though closer spacing between terminals 252/254 could be used.

An advantage of the battery terminals 252 and 254 is that they may be engaged by standard cable clamps as well. If it is desired to increase the area of surface contact between standard cable clamps and the terminals 252 and 254, thereby increasing electrical communication therebetween, insert members 260 and 262 having complementary "+" and "−"-shaped apertures 264 and 266 and rounded outer surfaces 268 sized similarly to standard battery posts may be provided for placement as "caps" over the terminals 252 and 254. The insert members 260 and 262 essentially convert the terminals 252 and 254 into the terminals of standard batteries, but may be removed when desired. While these insert members 260 and 262 could take the form of actual caps, that is, so that the terminals 252 and 254 are not visible when the insert members 260 and 262 are placed thereover, it is preferable to have the apertures 264 and 266 extend axially throughout the insert members 260 and 262 so that the "+" and "−" shapes of terminals 252 and 254 are visible when the insert members 260 and 262 are placed thereover. Such visibility is enhanced where the insert members 260 and 262 are slightly shorter or taller than the terminals 252 and 254.

Figure 7:
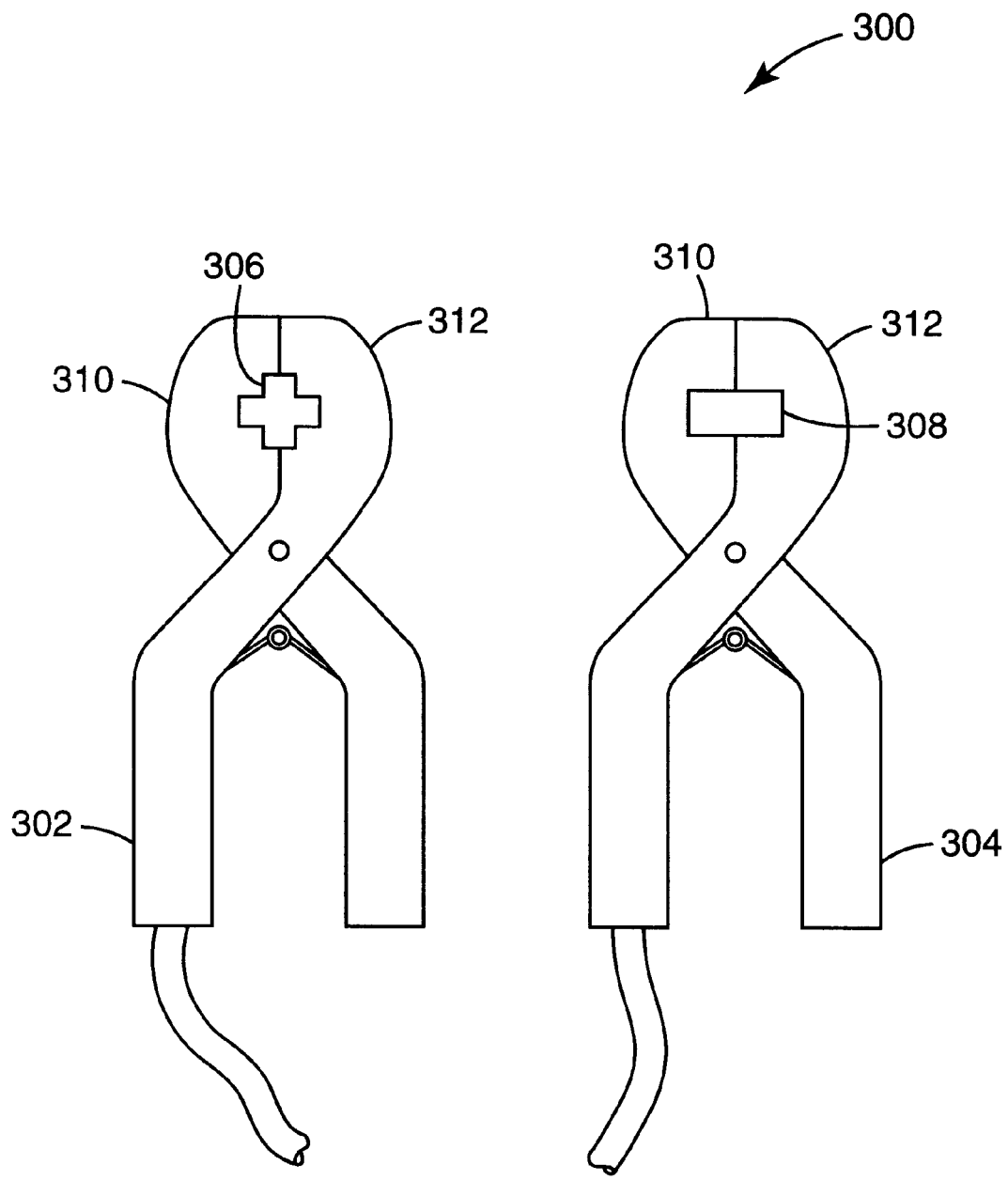
FIG. 7 is a plan view of jumper cable terminal clamps for use with batteries such as that of FIG. 6.

A preferred form of jumper cable terminal clamps ideal for use with batteries having terminals similar to the terminals 252 and 254 of FIG. 6 is designated generally in FIG. 7 at the reference numeral 300. These jumper cable clamps 302 and 304 generally correspond to standard jumper cable clamps, but rather than utilizing jaws having a toothed or rounded gripping surface (such as the rounded gripping surface illustrated in the clamps 168 of FIG. 4), the clamps 302 and 304 have gripping surfaces which define "+" and "−"-shaped apertures 306 and 308 when the jaws 310 and 312 of the clamps 302 and 304 are brought together. The mating fit of the corresponding "+" and "−"-shaped clamps 302 and 304 and terminals 252 and 254 ensures that the clamps 302 and 304 cannot come loose during use and slide or fall to strike surfaces having the opposite polarity, a common problem where jumper cables are subject to some degree of tension. The clamps 302 and 304 are also advantageous because they very firmly grip the positive and negative terminals 252 and 254 in a complementary manner, but they may be used with standard round-post battery terminals as well (such as the round-post terminals 210/212 of the battery 200 of FIG. 5). In either case, the clamps 302 and 304 provide the advantage that the "+" and "−"-shaped apertures 306 and 308 help to remind jumping personnel during use which battery terminals each conductor is to connect. This is particularly useful in view of the fact that many people who jump batteries are not familiar with the standard electrical convention that red is positive and black is negative, and may therefore mistakenly reverse connections.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. Following is an exemplary list of such modifications.

First, while the batteries 20, 200, and 250 of FIGS. 1, 5, and 6 above are shown and described as utilizing two or more sets of positive and negative terminals, only one set can be provided, as in common dry-cell batteries.

Second, while the batteries 20 and 250 of FIGS. 1 and 6 above are shown and described as including only female or only male terminals, a combination of each could be used, as by providing a positive male terminal and a negative female terminal. Complementary modifications can be made to the jumper cables in this case.

Figure 8:
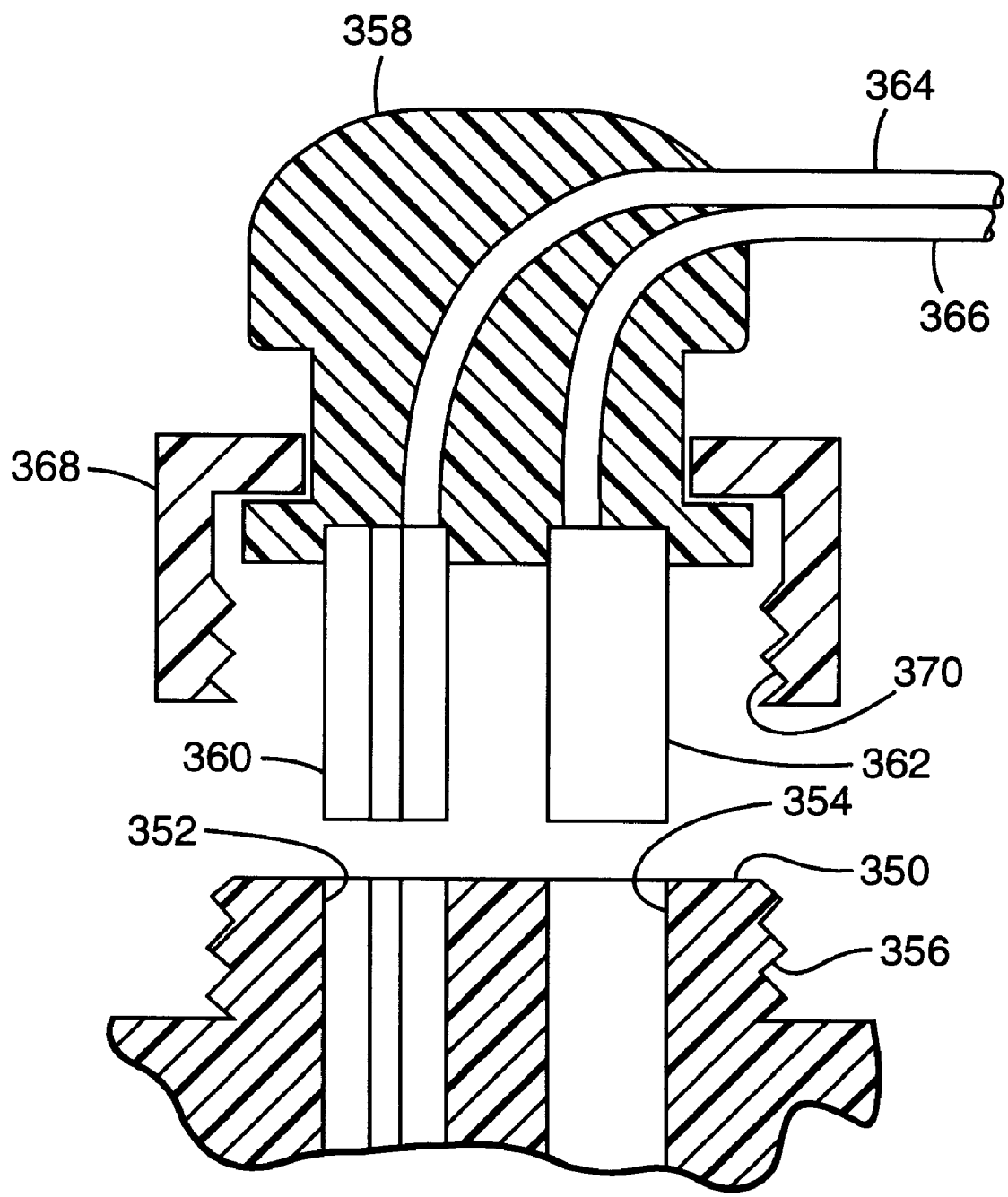
FIG. 8 is an elevated view (in section) of a battery and jumper cable arrangement presenting an alternative to that of FIGS. 1 and 2.

Third, optional forms of securement means apart from the complementary ridge 60/land 30 arrangement of FIGS. 1 and 2 are possible. FIG. 8 illustrates an exemplary alternate securement means wherein the battery terminal land 350, which includes "+" and "−"-shaped female terminals 352 and 354, has a circular perimeter with threading 356 surrounding its circumference. The cable plug 358, which includes "+" and "−"-shaped male terminals 360 and 362 and their positive and negative conductors 364 and 366, bears a collar 368 which is rotatable and slidable on plug 358 and which bears internal threading 370 complementary to threading 356. Thus, the plug 358 may be moved adjacent land 350 so that the male terminals 360 and 362 enter the female terminals 352 and 354, and the collar 368 can be rotated onto land 350 with the threading 356 and 370 engaging.

Figure 9:
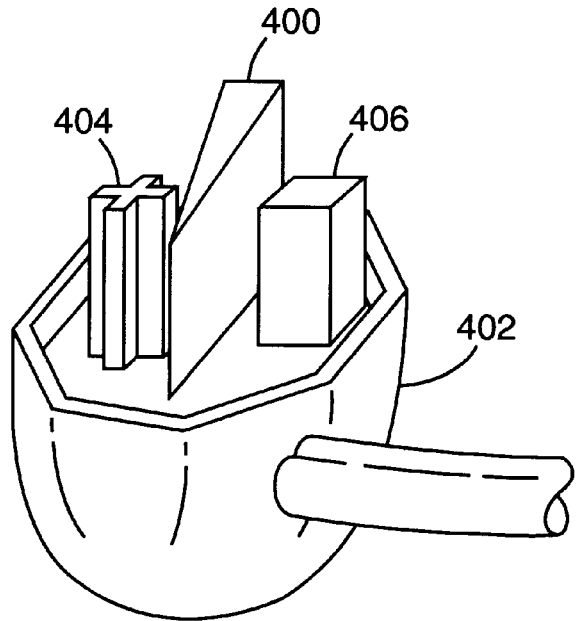
FIG. 9 is a partial perspective view of a third embodiment of a jumper cable in accordance with the present invention.

Fourth, as illustrated in FIG. 9, a nonconducting barrier can be placed between the male terminals on plug embodiments such as that illustrated in FIG. 2. Such a barrier 400 can extend from the plug 402 in spaced relationship from both the positive and negative terminals 404 and 406 to deter arcing between terminals, and a complementary female slot for receiving the barrier (not shown) can be installed in the land 30 in the battery 20 of FIG. 1. Apart from deterring arcing, such a barrier 400 has the further advantage that it further deters dislodgement of the plug 402 from the battery 20. As FIG. 9 illustrates, the barrier 400 (and the complementary slot in the land) may have a cross-sectional shape such that the slot can only receive the barrier when the barrier is oriented at some particular orientation, i.e., when the positive and negative plug and battery terminals are aligned, and not when the plug and battery terminals are reversed. As the plug 402 of FIG. 9 further illustrates, the barrier 402 may have a greater length than the plug terminals 404 and 406 so that the barrier must be properly aligned and engaged within the complementary slot in the land prior to engagement of the plug terminals 404 and 406 and the battery terminals, thereby further protecting against the possibility that the incorrect plug terminals will come in contact (and arc) with the battery terminals.

Figure 10:
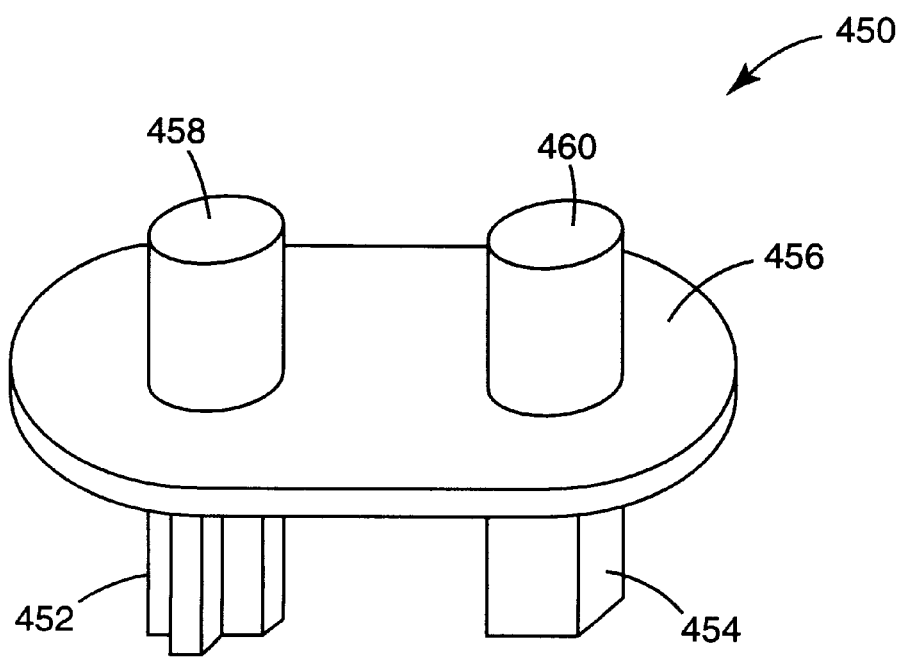
FIG. 10 is a perspective view of an insert member suitable for use with a battery such as that of FIG. 1 to adapt the battery terminals into post-style terminals.

Fifth, insert members similar in function to the insert members 260 and 262 of FIG. 6 can be developed for batteries such as the battery 20 of FIG. 1. FIG. 10 illustrates an insert member 450 having "+"-shaped and "−"-shaped positive and negative male terminals 452 and 454 which protrude through an insulating housing 456 and which are in electrical communication with post-style terminals 458 and 460. The insert member 450 can be installed in either of the terminal sets 22 or 24 of the battery 20 of FIG. 1 to adapt the battery 20 to have standard terminals.

The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. A battery including at least one positive battery terminal and at least one negative battery terminal, wherein one or more positive battery terminals have a "+" shape when viewed along an axis extending from the battery and one or more negative battery terminals have a "−" shape when viewed along an axis extending from the battery.

2. The battery of claim 1 including at least two positive battery terminals and at least two negative battery terminals, wherein the positive battery terminals are electrically connected and the negative battery terminals are electrically connected.

3. The battery of claim 1 wherein at least one battery terminal is defined by a female socket.

4. The battery of claim 3 wherein at least one battery terminal is defined by a male member.

5. The battery of claim 4 wherein at least one of the battery terminals defined by a male member defines a rounded post.

6. The battery of claim 1 wherein at least one battery terminal is defined by a male member.

7. The battery of claim 6 wherein at least one battery terminal is defined by a female socket.

8. The battery of claim 7 wherein at least one of the battery terminals defined by a male member defines a rounded post.

9. The battery of claim 6 in combination with at least one insert member wherein the insert member bears an aperture therein which is complementary to the male member, thereby allowing fitting of the insert member over the male member.

10. The battery of claim 1 in combination with a jumper cable including a positive conductor and a negative conductor, both conductors having opposing cable terminals, wherein at least two cable terminals are adapted to fit respective battery terminals having "+" and "−" shapes in complementary fashion.

11. The combination of claim 10 wherein the cable terminals adapted to fit battery terminals having "+" and "−" shapes are male members.

12. The combination of claim 10 wherein the cable terminals adapted to fit battery terminals having "+" and "−" shapes are female sockets.

13. The combination of claim 10 wherein the cable terminals adapted to fit battery terminals having "+" and "−" shapes comprise cable clamps having opposing jaws which define "+" and "−" shapes therebetween when the jaws are closed.

14. The combination of claim 10 wherein the jumper cable includes surge protection means situated between the opposing cable terminals for preventing current from flowing through at least one conductor when the voltage difference between the opposing cable terminals exceeds a predetermined value.

15. The combination of claim 10 wherein the jumper cable includes a normally open switch maintaining at least one of the conductors in an open state.

16. The combination of claim 15 wherein the normally open switch includes a timing means for maintaining the switch in a closed state for a predetermined time interval after the switch is actuated.

17. The combination of claim 15 wherein the jumper cable includes a lamp.

18. The combination comprising:
   a. a battery including at least one pair of battery terminals, each pair including a positive battery terminal having a "+" shape and a negative battery terminals having a "−" shape, and
   b. a jumper cable including a positive conductor and a negative conductor, both conductors having opposing cable terminals, wherein at least one cable terminal on the positive conductor is shaped to receive one positive battery terminal in complementary fashion and at least one cable terminal on the negative conductor is shaped to receive one negative battery terminal in complementary fashion.

19. The combination of claim 18 wherein the jumper cable includes:
   a. surge protection means situated between the opposing cable terminals for preventing current from flowing through at least one conductor when the voltage difference between the opposing cable terminals exceeds a predetermined value; and
   b. a normally open switch maintaining at least one of the conductors in an open state.

20. The combination comprising:
   a. a battery including a first battery terminal defined by a first female socket having a "+" shape when viewed from an axis of the first socket, and a second battery terminal defined by a second female socket having a "−" shape when viewed from an axis of the second socket;
   b. a jumper cable including a cable terminal having a first male member having a "+" shape when viewed from an axis of the first male member, and a second male member having a "−" shape when viewed from an axis of the second male member.

\* \* \* \* \*